July 24, 1956   J. A. ADLOFF   2,755,874
MOTOR VEHICLE RADIATORS RESILIENTLY AND SLIDABLY MOUNTED
Filed Dec. 1, 1952
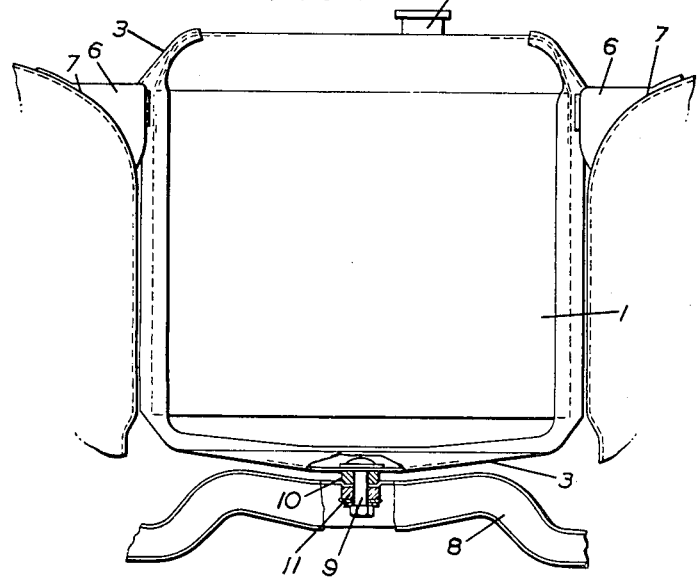
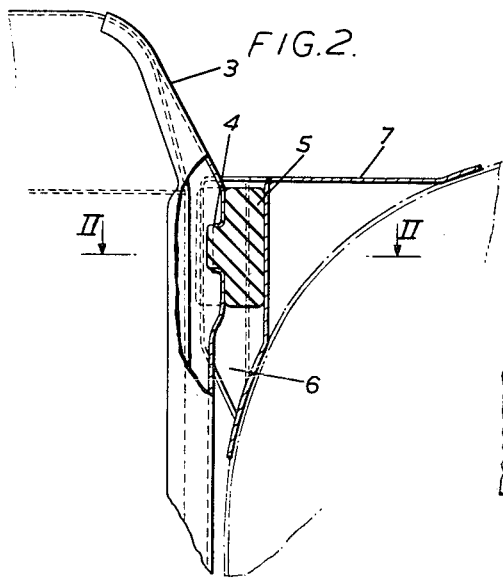
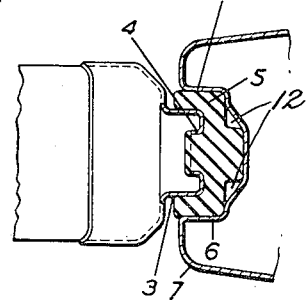
Inventor
Jacob August Adloff
By
Spencer, Willits & Baillio
Attorney

United States Patent Office 2,755,874
Patented July 24, 1956

---

2,755,874

MOTOR VEHICLE RADIATORS RESILIENTLY AND SLIDABLY MOUNTED

Jakob August Adloff, Mainz-Gonsenheim, Germany, assignor to General Motors Corporation, Detroit, Mich., a corporation of Delaware Application December 1, 1952, Serial No. 323,486

Claims priority, application Germany December 4, 1951

2 Claims. (Cl. 180—68)

The present invention relates to a resilient mounting for a motor vehicle radiator. As is known, the suspension of such a radiator must be able to stand up to the stresses arising from vibrational differences and critical oscillations and to jolts occurring during running, and must at the same time ensure that the radiator resting on the chassis and associated with the engine, is satisfactorily connected up. The present invention solves this problem economically and reliably in a manner particularly suitable for mass production.

The invention provides a radiator mounting for motor vehicles, wherein the radiator is attached at the sides to the vehicle frame or bodywork by means of vertical tongue and groove arrangements comprising rubber blocks slidably engageable with vertical guides, and the attachment is completed by a further resilient support at the base of the radiator. Advantageously the rubber blocks may be secured to the radiator, and the vertical guides formed by recesses in the fenders, wheel housing or other part of the vehicle bodywork.

An example of a mounting according to the invention is illustrated in the drawings and particularly described below.

Figure 1 shows the radiator and the mounting in front elevation.

Figure 2 illustrates a lateral fixing point to a larger scale, and partly in section, and Figure 3 gives a section on II—II of Fig. 2.

Referring to the drawings, 1 designates the radiator which is provided in the usual manner with a filler pipe 2 and a tension band 3. At the vertical sides of the radiator, towards the top, the tension band 3 is provided with recesses or cavities 4 in each of which a corresponding part of a profiled rubber block 5 is fitted. This profiled rubber block 5 laterally embraces the tension band 3 (see Fig. 3) and is so shaped that from above it can be slid into vertical guides 6 each of which is provided in a wall of the wheel housing or of the bodywork 7 adjacent a vertical side of the radiator. Preferably the rubber block 5, is provided with recesses 12 (see Fig. 3) which only "fill out" into the guide under the influence of pressure compressing the block 5. The radiator 1 is secured to the transverse frame member 8 by means of a tension bolt 9 which passes through a rubber bushing in the form of two rubber rings 10, 11 arranged at either side of the seating face on the transverse member 8. The upper rubber ring 10, disposed between the radiator 1 and the member 8, rests in a depression in the transverse member 8. The bolt 9, passes through the rings and the seating with clearance so that an omni-directional resilient mounting of the radiator is ensured, at this point also.

The construction described provides the radiator with a resilient three-point mounting.

To fit the radiator in place it is only necessary to slide it into the guides 6 from above and then secure the bolt 9 at the base.

I claim:

1. A motor vehicle radiator assembly comprising a radiator core, head tank and side members fixed together as a unit, a pair of spaced supports and a vehicle frame member cooperatively defining the sides and bottom of a space in which said unit is retained with clearance, detachable central means resiliently adapted to hold said unit to said frame member, resilient attachment means interposed between each of said spaced supports and the adjacent upper side portion of one of said side members, and each of said resilient attachment means including a vertically grooved structure as part of one of said supports, a projection fixed to one of said side members and extending into said grooved structure, and a resilient rubbery block fixed to said projection and extending into said grooved structure, the arrangement being such that detachment of said central means frees said unit for vertical motion relative to said spaced supports in mounting and demounting of said assembly.

2. A motor vehicle radiator assembly comprising a core, head tank and side members fixed together as a unit radiator, a pair of spaced supports defining a gap in which said radiator unit is retained, a frame member for said vehicle arranged beneath and spaced from said radiator unit, a resilient attachment securing the base of said radiator unit to said frame member, each of said side members and a corresponding one of said spaced supports being interlocked in a vertical tongue and groove relationship permitting relative vertical movement, and yieldable rubber-like material interposed between each side member and the corresponding support to resist horizontal relative motion between the latter two parts.

References Cited in the file of this patent

UNITED STATES PATENTS

| | | |
|---|---|---|
| 1,176,934 | Taylor et al. | Mar. 28, 1916 |
| 1,447,695 | Storms | Mar. 6, 1923 |
| 1,593,244 | Cutler | July 20, 1926 |
| 1,593,245 | Cutler | July 20, 1926 |
| 1,773,481 | Fokker | Aug. 19, 1930 |
| 1,833,424 | Jansson | Nov. 24, 1931 |
| 2,004,258 | Waterbury | June 11, 1935 |
| 2,100,490 | Rippingille | Nov. 30, 1937 |
| 2,104,723 | Best | Jan. 11, 1938 |
| 2,319,843 | Berlin et al. | May 25, 1943 |

FOREIGN PATENTS

| | | |
|---|---|---|
| 27,184 | France | Jan. 16, 1924 |
| | (1st addition to No. 544,209) | |
| 988,381 | France | Apr. 25, 1951 |
| 353,058 | Great Britain | July 16, 1931 |
| 22,654 | Great Britain | Oct. 14, 1907 |